July 21, 1964  J. W. YOWELL ETAL  3,141,496
APPARATUS AND PROCESS FOR FORMING CORRUGATIONS IN TUBING
Filed March 21, 1957  3 Sheets-Sheet 1
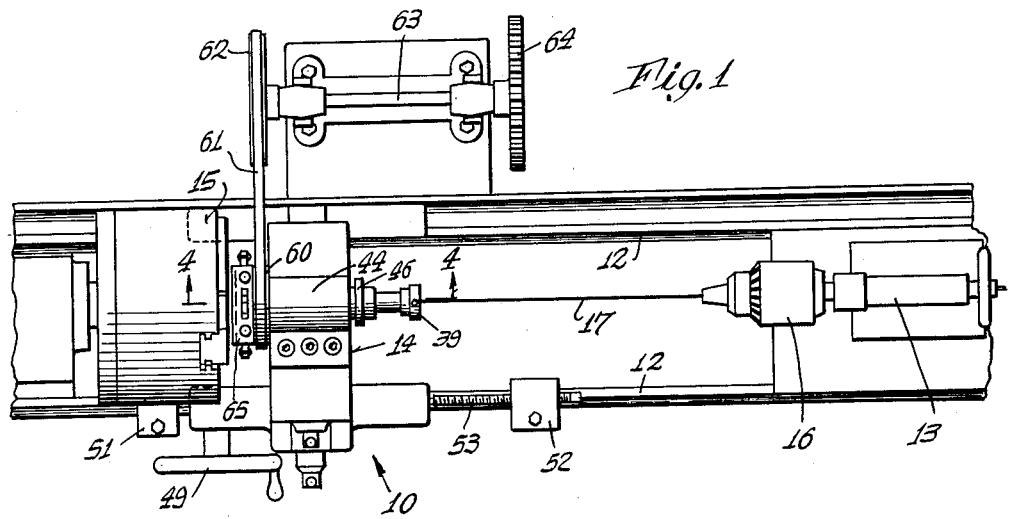
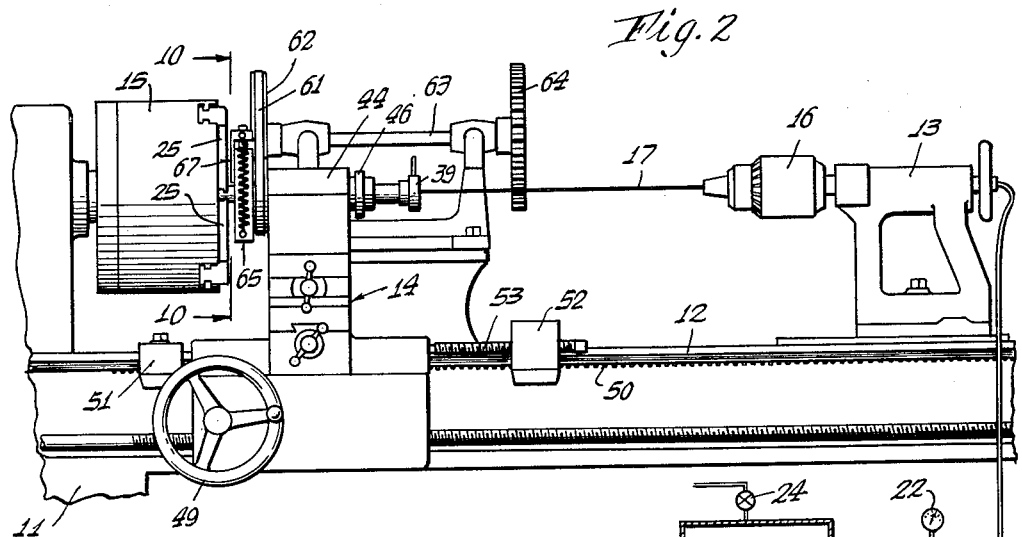
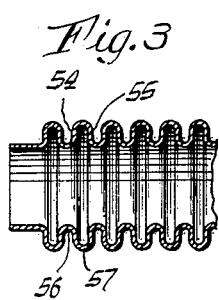
INVENTORS
Joseph W. Yowell
Donald B. Miner
BY
Johnson and Kline
ATTORNEYS

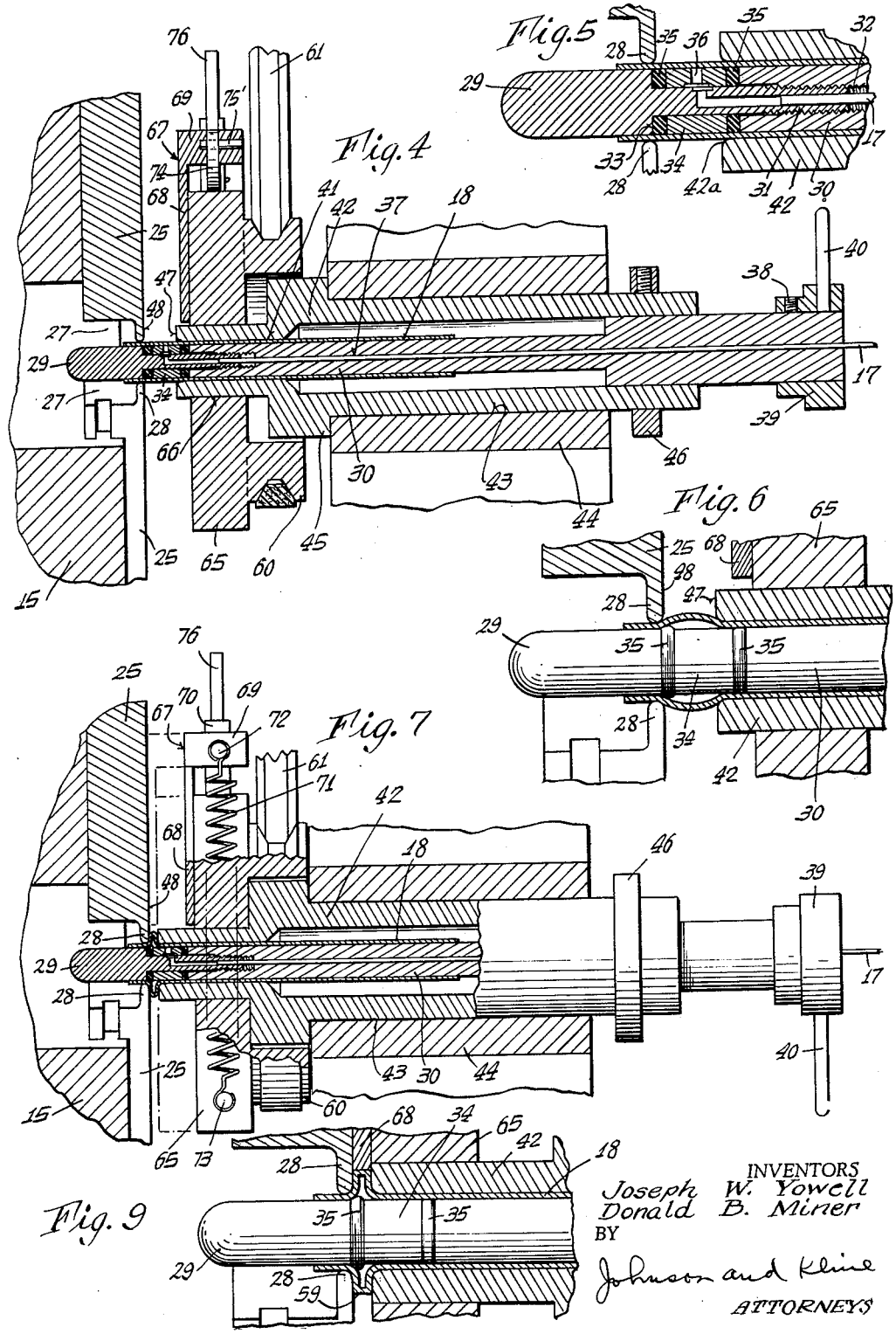

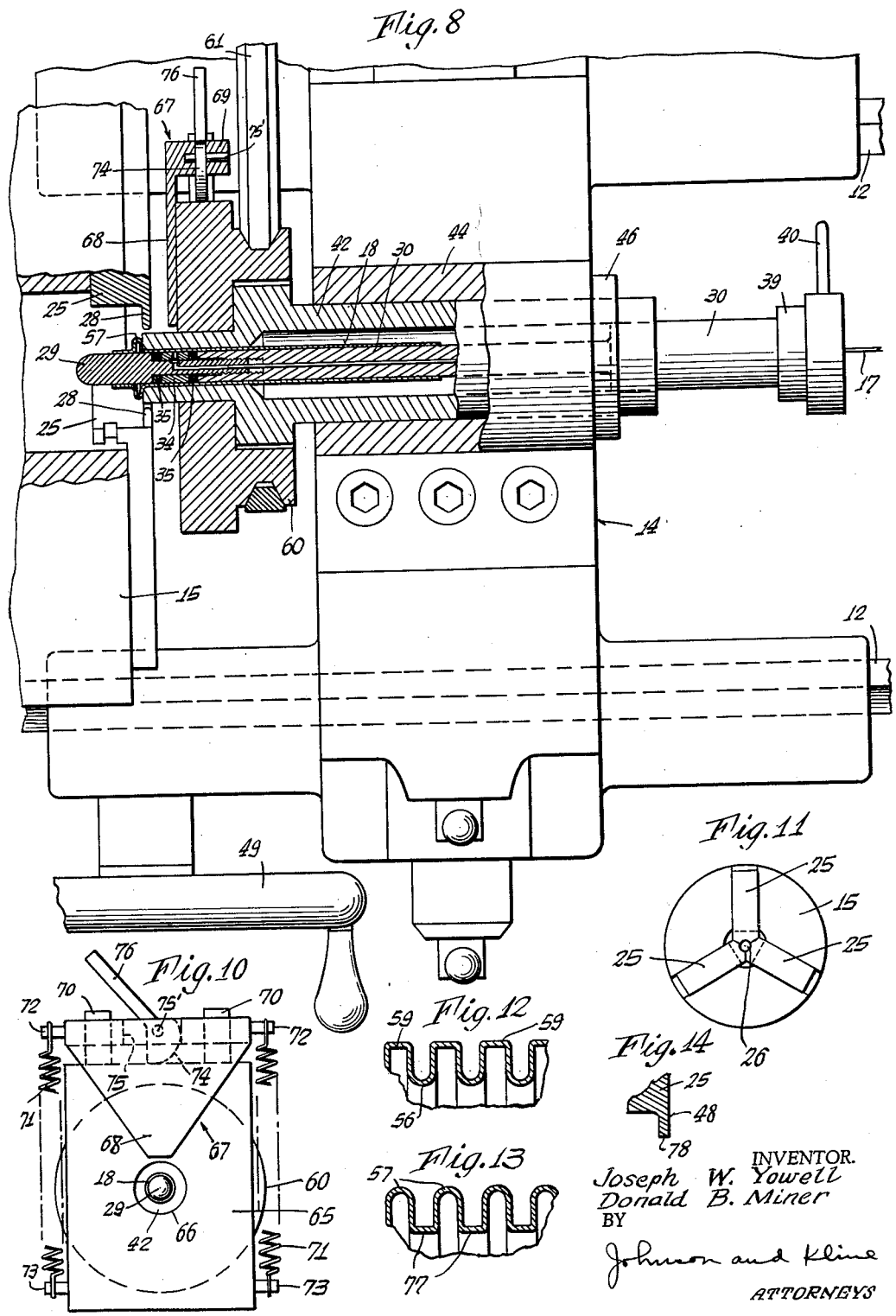

United States Patent Office 3,141,496
Patented July 21, 1964

3,141,496
APPARATUS AND PROCESS FOR FORMING
CORRUGATIONS IN TUBING
Joseph W. Yowell, Hillspoint Road, Westport, Conn., and
Donald B. Miner, Orange Center Road, Orange, Conn.
Filed Mar. 21, 1957, Ser. No. 647,631
6 Claims. (Cl. 153—73)

The present invention relates to a process and an apparatus for forming corrugations in thin-wall, straight tubing.

At present, the most prevailing method of forming corrugated tubing consists of subjecting the interior of a complete length of tubing to a fluid pressure which is sufficient to deform the sides of the tubing. The exterior of the tubing is mechanically constrained against deformity at points spaced along its length by toroidal rings. During the deforming operation, the rings are axially moved together mechanically to form the finalized corrugations. The portion of the tubing engaged by the rings forms the troughs of the corrugations while the unrestrained portions form the crests of the corrugations with a single corrugation consisting of a trough and a crest. This method of thus forming corrugations is generally referred to as "hydroforming" while the word "tubing" is used to indicate tubes having both ends open and tubes having an end closed, the latter, after being hydroformed, being more specifically referred to as "bellows."

Typical hydroforming process and apparatus are described in U.S. Patent No. 2,217,799, granted to Giesler, and No. 2,610,667, granted to Puster. An examination of these patents discloses that present apparatus for hydroforming tubing are exceedingly complex and complicated machines, representing an initial high investment, including a large number of parts which are intricately interconnected to each other. The machines require a large expenditure in labor and parts to change the machine from making one size of tubing to another. Though these machines do produce corrugated tubing for a low unit cost per tube in large numbers, the high cost of tooling-up the machine to change from one size tubing to another, severely limits the number of sizes and shapes of tubing which may be economically produced, to those sizes having a large demand. Accordingly, there are only a few standard sizes which are being commercially made and the cost of manufacturing tubing varying from the standard sizes to meet a small demand is prohibitive. In addition, the machines function to produce corrugations in substantially the whole length of tubing and are not capable of forming corrugations in a length of tubing only at spaced, selected, sections, as may be required in a long length of tubing, wherein it is desired to have it flexible at only certain designated sections. Another drawback of the known hydroforming machines is the lack of individual control over the shape of each convolution, which at times, results in corrugations which differ from adjacent corrugations and there is thus a lack of uniformity between convolutions.

It is an object of the present invention to provide a method and apparatus for hydroforming corrugations in tubing which obviates the above drawbacks in presently known machines.

Another object of the present invention is to provide a machine and method for forming only a single corrugation at a time and in which one or a plurality of corrugations may be formed in preselected sections of a long length of tubing to create flexibility at the sections.

A further object of the present invention is to provide a machine and method in which various sizes of corrugated tubing may be economically manufactured in small quantities and in which only a few parts, which are easily interchangeable, are needed for each size.

In attaining the above objects, the machine of the present invention forms a substantially fluid tight chamber inside the tubing only at the section of the tubing where it is desired for the single corrugation to be formed. The chamber is as long or a little longer than the length of material of the tubing which forms the crest portion of the corrugation. Restraining elements engage the periphery of the tubing at each end of the section with the section of the tubing being unrestrained so that when fluid pressure is introduced into the chamber, the section will be deformed axially outward to form the crest portion with the bends of the section being around the ends of the restraining means. The restrained portions simultaneously form the trough portion of the corrugation. During the initial portion of the deforming operation one of the restraining means is permitted to move axially toward the other solely by the action of the section bowing outwardly and shortening in length to start the formation of the crest. Then, the one restraining means is mechanically moved axially towards the other to finish the crest forming operation. The depth of the crest is controlled by the value of the pressure, by the length of the section and by the amount of axial movement of the restraining means. The pressure and the restraining means are then released and the tubing is advanced so that the pressure chamber is positioned in another section of the tubing in which the crest portion of the next corrugation is to be formed.

By this method, and the apparatus of performing the method of forming only one corrugation at a time and with the same tools, the uniformity of a plurality of corrugations is assured. The feature of permitting free movement of the restraining means at the beginning of the operation enables the thickness of the corrugation to remain substantially the same as that of the tubing since the ends of the section where bending initially occurs is the place where the final bends are present between the crest and trough portions of the corrugations. This obviates flowing of the material of the tubing about the edge of the restraining means which would vary the wall thickness in the corrugation and would weaken, if not rupture, the corrugation. The special parts of the machine which are necessary for each size of tubing as will be hereinafter apparent, may be economically made and easily interchanged to provide for the forming of different size tubes.

A feature of the invention resides in being able to form, in addition to a conventional corrugation whose troughs and crest are semi-circular in cross-section, for a corrugation in which either the trough or the arcuate outer end of the crest is flattened during the forming of the crest or immediately thereafter. Tubing, having corrugations in which a portion thereof is flat, is reworked to form tubing which is capable of withstanding higher pressures than heretofore possible. An internal pressure tubing is disclosed and claimed in our copending application, Serial No. 643,055, filed February 28, 1957, now Patent No. 3,019,820, granted February 6, 1962, while in U.S. Patent No. 2,749,942, granted to us on June 12, 1956, there is shown and claimed an external pressure bellows.

Other features and advantages will hereinafter appear.

In the accompanying drawing:

FIGURE 1 is a plan view of the apparatus of the present invention.

FIG. 2 is an elevation thereof.

FIG. 3 is a sectional view of conventional corrugating tubing formed by the present method and machine.

FIG. 4 is an enlarged view taken on the line 4—4 of FIG. 1.

FIG. 5 is an enlarged view of a portion of FIG. 4 showing the formation of a pressure tight chamber inside the tubing.

FIG. 6 is a view similar to FIG. 5 showing the initial deformation of the tube after introducing pressure into the chamber.

FIG. 7 is a view similar to FIG. 4 showing the parts at the end of the crest forming operation.

FIG. 8 is a view similar to FIG. 4 showing the parts at the end of the corrugation forming operation.

FIG. 9 is an enlarged view showing the flattening of a crest.

FIG. 10 is a view taken on the line 10—10 of FIG. 2.

FIG. 11 is a face view of the chuck.

FIG. 12 is a portion of an axial section of a tubing formed with a flattened crest.

FIG. 13 is a portion of an axial section of tubing having a flattened trough.

FIG. 14 is a partial section of a jaw of the chuck used to form the tubing of FIG. 12.

Referring to the drawing, FIGS. 1 and 2, in the illustrated embodiment, the apparatus of the present invention is indicated by the reference numeral 10 and resembles a conventional lathe since it is desired to have axial alignment of a plurality of parts and movement of the parts along the axis. As usual in typical lathe construction, there is a base 11 having a pair of spaced parallel elements 12 forming a bed and a tailstock 13 resting on the bed for movement thereon. There is additionally a compound tool rest 14 and a three jaw universal type chuck 15. Though the apparatus as shown includes conventional lathe parts, the normal usage of a lathe such as revolving of the chuck is not utilized and hence only the parts forming the present invention will be referred to.

Mounted in the tailstock 13 is a chuck 16 which is utilized for centering and holding a conduit 17 through which fluid pressure may be introduced into the interior of a length of straight thin-wall tubing 18 to form a corrugation. While a chuck is shown, a passageway plus clamping means in the tailstock, may be utilized in place thereof. The conduit 17 extends through the tailstock to a tank 19 in which hydraulic fluid 20, under pressure is maintained, at, for example, 2500 p.s.i. A two-way valve 21 is positioned between the tank 19 and the conduit 17 and a pressure gauge 22 is also located in the conduit 17. The valve 22 in the position shown connects the tank with the conduit while a quarter clockwise turn connects the conduit 17 with an exhaust line 23. The tank includes a valved inlet 24 by which air pressure may be introduced into the tank to maintain the hydraulic fluid at the desired pressure for the forming of a plurality of corrugations in the tube in addition to permitting fluid to be poured into the tank. The provision of having air in the tank causes a substantially constant pressure of the hydraulic fluid to be maintained for forming a considerable number of corrugations without requiring any adjustment or valve control other than the normal "on-off" operation of the valve 21. The problem of maintaining a constant pressure is thus obviated.

The length of straight, thin-wall tubing 18 in which the corrugations are to be formed, has its axis positioned on the center line of the lathe. The three jaw chuck 15, as shown in FIG. 11, has three jaws 25 mounted for uniform radial movement as is well known in the art. The jaws when closed define a circular opening 26 which is substantially equal to the outside diameter of the tubing. While these jaws may be provided with extensions which define the opening and are easily positioned on the jaws, in the instant embodiment, the jaws are shown as being machined to form the circular opening 26.

Referring to FIG. 4, the jaws of the chuck are shown cut away as at 27 to provide lips 28 which contact the exterior of the tubing. The thickness of the lips is equal to or less than the distance from one crest to another when a plurality of corrugations are formed in the tubing 18. Also, the embodiment shown in FIGS. 4 to 8 inclusive, which is used to make corrugations having the shapes shown in FIGS. 3, and 12, has the edges of the lip 28 which contact the tubing 18 arcuate.

Positioned within the tubing is a means for forming a fluid tight chamber. This includes a nose 29 and a mandrel 30 having axial cross-sections as shown. The nose has a reduced exteriorly threaded portion 31 extending toward the mandrel for engagement in an internally threaded bore 32 in the mandrel. Positioned between the end of the mandrel and a flange 33 formed in the nose at the beginning of the reduced portion 31 is an annular spacer 34 with rubber O-rings 35 positioned on each side thereof. The space between the O-rings and the tubing 18 constitutes the fluid tight chamber.

In order to provide for the introduction of fluid pressure into the chamber, the spacer 34 and the reduced portion 31 of the nose are formed with a passageway 36. An axial passageway 37 is formed in the mandrel and the conduit 17 extends therethrough and terminates in the passageway 37, as shown. The conduit 17 is soldered, brazed or otherwise fastened to the reduced portion 31 of the nose which seals the passageway 37 and the conduit 17.

The diameter of the nose, spacer, O-rings, and mandrel are slightly less than the inner diameter of the tubing 18 so that they may be inserted inside the tubing. The mandrel extends toward the tailstock and has attached at the tailstock end, as by a set screw 38, a collar 39 having a handle 40 to provide for rotation of the mandrel with respect to the nose. The tubing 18 is positioned within a bore 41 formed in a shuttle 42. The shuttle 42 is mounted in an aperture 43 formed in a holder 44 carried by the tool rest 14 for free axial movement with relation to the holder 44 and tool rest 14. The shuttle is provided with a flange 45 and a collar 46 to limit the axial movement of the shuttle.

In making tubing having a corrugation with the shape shown in FIG. 3, the tubing 18 is slipped onto the nose and mandrel to the position indicated in FIG. 4. The jaws 25 of the chuck 15 are closed to tightly engage the tubing between the lips and the nose. The handle 40 of the mandrel is rotated, while the nose is maintained stationary, to thread the mandrel on to the reduced portion 31 of the nose to compress the O-rings to the shape indicated in FIG. 5. This forms a fluid tight chamber between the O-rings and the interior surface of the tubing. The end of the shuttle indicated at 47 and the proximate face 48 of the lips are spaced apart at a distance which is equal to the length of the section of the tube which will form the crest of the corrugation and these elements constitute a restraining means and/or restriction. Fluid pressure is then introduced into the chamber by means of the valve 21 and conduit 17 and this pressure is sufficient to cause the section to initially bow outwardly to form an annular portion having a shape shown in FIG. 6. The mechanical expansion by the rotative movement of the mandrel is an important feature of the present invention since it allows for reasonable variations in the interior dimension of the tubing and minimizes wear on the O-rings.

During the initial deforming operation, the shuttle is free to move axially in the holder and, as the metal in the section is bowed outwardly, the tube shortens and the shuttle moves towards the chuck. After the initial bulging out and with pressure still in the chamber the shuttle is mechanically moved axially to form the final crest, with the parts having the position shown in FIG. 7. The pressure is then released by the valve 21 and the jaws 25 of the chuck are opened. The shuttle is then moved axially to move the formed crest past the lips to a position shown in FIG. 8. In this position, the corrugation is located in the cut-out 27 and if the thickness of the lips is the desired distance between crests, then the adjacent side of the crest abuts the inner surface of the lips when the lips are closed. The lips are closed and the handle 40 is rotated to radially expand the O-rings 35 to cause the tubing to be stationary with respect thereto and the shuttle is moved axially away from the lips by the tool rest 14. This positions the parts as shown in FIG. 4 preparatory to forming the next corrugation. The above set forth steps are then repeated to form the next corrugation.

As shown in FIGS. 1 and 2, the tool rest 14 which carries the holder 44 is mounted on the parallel elements 12 and has a wheel 49 connected to gearing in the tool rest (not shown) which mates with a rack 50 so that movement of the wheel causes movement of the tool rest along the axis of the tubing. To provide for a uniformity in forming each corrugation there are two stops 51 and 52 mounted on one of the parallel elements 12. The stop 52 is capable of finite adjustment by means of a threaded rod 53. The distance between the two stops is substantially equal to the axial length of the tubing which is shortened by the forming of the crest. Thus after movement of the tool rest to the position where this crest of the corrugation is formed as shown in FIG. 7, the tool rest abuts the stop 51, while the tool rest abuts the stop 52 during the initial positioning of the parts shown in FIG. 4.

Repeated operation of the above noted steps will result in corrugated tubing with corrugations having a cross-sectional shape as shown in FIG. 3. Each corrugation has flat, radially extending, coaxial spaced portions 54 and 55 and arcuate, interconnecting, interior and exterior portions 56 and 57. The portions 54, 57 and 55 have been and are referred to as the crest and the portion 56 as the trough of a corrugation. It will be appreciated that flat portions 54 and 55 are caused by the pressure forcing the section of the tubing against the face 48 of the lips and edge 47 of the shuttle respectively while the section is being mechanically axially compressed, while the interior arcuate portion 56 is formed by arcuate ends 28 of the lips and a rounded edge 42a between the bore and the end 47 of the shuttle. The exterior arcuate portion 57 is formed naturally by the deforming pressure in the section of the tubing.

To form an over-pressure resistant tubing which may be reworked to the shape disclosed and claimed in our Patent No. 2,749,942 above mentioned, it is necessary to form each corrugation with the exterior interconnecting portion 57 of each corrugation flat. The shape of the corrugation is shown in FIG. 12 with the flat portion being indicated by the reference numeral 59. To effectuate this shape, there is mounted for rotation on the shuttle 42 a pulley 60 driven by a V-belt 61. The V-belt 61 runs over another pulley 62 and the latter is connected by a shaft 63 to a gear 64. The gear is preferably driven by a motor (not shown) to revolve the pulleys. The pulley 60, as shown in FIGS. 2, 7 and 10, has attached thereto a flat rectangular plate 65 which has a bore 66 through which a portion of the shuttle extends. The plate 65 and pulley 60 are free to rotate with respect to the shuttle. Mounted on the plate 65 is a rolling tool 67 which is radially spring urged into engagement with the arcuate portion of the crest to flatten it. To this end, the rolling tool 67 has a right angle cross-sectional shape providing two legs 68 and 69. As shown in FIG. 10, the leg 68 is V-shaped with the apex of the V flat. The other leg 69 of the tool 67 has apertures through which two pins 70 fastened to the plate pass through to enable movement of the tool radially of the tubing. In order to create mechanical pressure between the rolling tool and the crest, a pair of springs 71 are provided. One end of the springs is attached to pins 72, one fixed to each end of the leg 69 while the other ends of the springs are fixed to pins 73 fastened in the sides of the plate 65. The springs 71 are normally under tension. In order to raise and maintain the rolling tool spaced from the tubing, there is provided a cam 74 having a shape as shown in FIG. 10 mounted in a slot 75 formed in the leg 69. A pivot pin 75′ passes through the cam 74 to enable rotation thereof by means of a handle 76.

Operation of the cam 74 by its handle 76 to one position permits the springs to bias the rolling tool inwardly toward the tubing while operation in the other direction forces the cam surface against the edge of the plate and raises the rolling tool from the tubing and maintains it in this position.

After the operation shown in FIG. 7, the rolling tool is manually moved on the shuttle to a position shown in FIG. 9. The cam is operated to cause the rolling tool to engage the exterior of the corrugation and the pulley is rotated by the gear and V belt to rotate the tool about the corrugation to flatten the same into the desired shape. During this operation, hydraulic pressure may or may not be present in the chamber. The width of the leg 68, as shown, is substantailly equal to the distance between the proximate face 48 of the lips and the end 47 of the shuttle so that substantially all of the crest is subjected to the force of the rolling tool. Moreover, the radial length of the end 47 of the shuttle and the face 48 of the lips is greater than the height of the crest which supports the flat radial portions 54 and 55 of the crest as the tool rolls the arcuate portion flat.

After rolling the surface flat, the rolling tool is stopped rotating and raised by the handle. Then the step shown in FIG. 8 is effectuated and the forming the another convolution beings. This results in a tubing which has corrugations having the shape shown in FIG. 12.

It will be appreciated that by rolling the flat portion on individual corrugations at the time that they are formed provides for uniformity as the side walls of the corrugation are given maximum support by the proximate face 48 of the jaws and the edge 47 of the shuttle. In addition, the flattening of the arcuate interconnecting causes the flat portion to have a greater thickness than the arcuate portion had, which is a desirable characteristic in the ultimate forming and use of external pressure tubing.

In order to provide for the formation of internal over-pressure resistant tubing such as disclosed in our copending application, Serial No. 643,055, now Patent No. 3,019,820, the inner arcuate interconnecting portions 56 of a conventional corrugation have to be flat. This shape of corrugation, as produced by the present machine and method is shown in FIG. 13, with the flattened portion being indicated by the reference numeral 77. This is accomplished in the present apparatus by forming the lips of the jaw, as shown in FIG. 14. The axial surface 78 of the jaw is flat and at right angles with the proximate face 48. In addition there is a right angle between the end of the shuttle 47 and the bore 41 in which the tubing is positioned. Thus, when the tubing is deformed by the pressure there will be right angle bends formed in the tubing at the lip and at the face of the jaws and also at the end 43 and bore 41 of the shuttle. The flat axial surfaces on the bore 41 and the jaws will maintain the portion of the tubing thereagainst flat.

It will thus be apparent in the above method and apparatus that in order to change from one size of tubing to another, it is only required to interchange jaws on the chuck, a shuttle, a mandrel and a nose. These parts are relatively inexpensive to manufacture and may be quickly interchanged with each other.

The total amount of material which forms one corrugation is substantially equal to the distance between the stops 51 and 52 plus the distance between the tool rest 14 and the collar 46 on the shuttle 14. By varying the stop 51, the axial width of the crest of the corrugation is varied. By varying the stop 52 the length of tubing which is formed into the crest of a corrugation can be varied, which is a factor in determining the height of the crest. By varying the stop collar 46, the axial distance between crests can be varied, which is the axial length of the trough.

The machine of the present invention may be utilized to form higher crests than heretofore possible by partially forming a corrugation and then re-positioning the machine to introduce more tubing between the restraining means and successively deforming both portions into the desired shape of corrugation. Also, by reason of forming only one corrugation at a time, higher deforming pressures may be used than in the previously disclosed types of hydroforming machines, which enables greater variation in the depth and width of the corrugations and hence greater flexibility of the machine.

It will be appreciated that there has been set forth in the foregoing a novel method of forming a corrugation in thin-wall straight tubing in which only a single corrugation is formed at a time. In the forming of the corrugation, there is initially formed in the tubing at the section thereof where the corrugation is to be formed a substantially fluid tight pressure chamber into which, fluid, under a pressure sufficient to deform outwardly the tubing, is introduced. The portion of the tubing forming the crest of the corrugation is unrestrained while its end portions are restrained so that an outward bend occurs at each end of the section. After the initial pressure deforming, one end of the section is mechanically moved towards the other to form the finished corrugation. Thus the bends that are initially formed at the ends of the section are those present in the final shape of the crest which prevents the flowing of the tubing around the corners of the restraining means and thus a stronger corrugated tubing is assured. Also the thickness of the material in the corrugation is substantially equal to the original thickness of the tubing.

The novel machine for carrying out the above method includes the apparatus for performing the step of permitting a restraining means at one end of the section to move axially toward the restraining means at the other end solely by the action of the section of the tubing therebetween shortening in length as it is initially deformed by the pressure. The present machine in addition to being able to form corrugations having arcuate interconnecting portions also can form corrugations which have a flattened, either outer or inner, interconnecting portion.

Variations and modifications may be made within the scope of the claims and portions of the improvements may be used without others.

We claim:

1. The method of forming a corrugation, having a crest whose outermost portion is flattened, in straight, thin-wall tubing comprising the steps of positioning a section of the tubing between two spaced circumferential restrictions to prevent radial outward bulging of the adjacent portion of the tubing; forming a hydraulic chamber within the tubing for at least the length of the section of the tubing; introducing sufficient hydraulic pressure into the chamber to radially deform outwardly the section of tubing; axially compressing the section; and subjecting the arcuate outermost portion of the crest to a mechanical force to flatten the arcuate portion.

2. The method as defined in claim 1 including the step of supporting the sides of the corrugation by the spaced restrictions during the mechanical deforming of the arcuate outer portion of the crest.

3. The method of forming a plurality of corrugations, in thin-wall, straight tubing with each corrugation having the outer portion of its crest flattened comprising the steps of positioning a section of the tubing between two spaced circumferential restrictions to prevent radial outward bulging of the adjacent portion of the tubing; forming a hydraulic chamber within the tubing for at least the length of the section of the tubing; introducing sufficient hydraulic pressure into the chamber to radially deform outwardly the section of tubing; axially compressing the section to produce a crest having an arcuate outer portion; mechanically working the arcuate outer portion to flatten it; reducing the pressure; and positioning the next section of the tubing to be bulged out between the two spaced restrictions.

4. The method of forming a plurality of corrugations, for thin-wall, straight tubing with each corrugation having the outer portion of its crest flattened comprising the steps of positioning a section of the tubing between two spaced circumferential restrictions to prevent radial outward bulging of the adjacent portion of the tubing; forming a hydraulic chamber within the tubing for at least the length of the section of the tubing; introducing sufficient hydraulic pressure into the chamber to radially deform outwardly the section of tubing; axially compressing the section to produce a crest having an arcuate outer portion; reducing the pressure; mechanically working the arcuate outer portion to flatten it; and positioning the next section of the tubing to be bulged out between the two spaced restricions.

5. An apparatus for forming a single corrugation having a flattened outer crest portion in thin-wall, straight tubing comprising means insertable in the tubing for forming a substantially fluid tight chamber with a section of the tubing; means for introducing and controlling fluid pressure in the chamber; means encircling the tubing adjacent each end of the section with a portion of the section being unencircled; means for axially moving one of the encircling means toward the other whereby introduction of pressure and movement of the encircling means causes the section to bulge outwardly to form the crest of a corrugation; and means having a tubing engaging portion movable between the encircling means for mechanically deforming the end portion of the crest into an annular hoop having a flat cross-section.

6. The invention as defined in claim 5 in which the deforming means includes a spring urged tool, the tubing engaging portion includes a straight edge surface on the tool which is engageable with the arcuate end portion of the corrugation and a support means for the tool for enabling the tool to be revolved about the end portion.

References Cited in the file of this patent

UNITED STATES PATENTS

| | | |
|---|---|---|
| 605,195 | Birtwisle | June 7, 1898 |
| 1,702,047 | Fulton et al. | Feb. 12, 1929 |
| 1,879,663 | Dreyer | Sept. 27, 1932 |
| 2,028,150 | Grant | Jan. 21, 1936 |
| 2,460,580 | Huber | Feb. 1, 1949 |
| 2,522,915 | Woods | Sept. 19, 1950 |
| 2,756,804 | Schindler et al. | July 31, 1956 |
| 2,773,538 | De Mers | Dec. 11, 1956 |